(No Model.)
J. ABSTERDAM.
Car Wheel.
No. 236,525.    Patented Jan. 11, 1881.
Fig. 1.    Fig. 2.
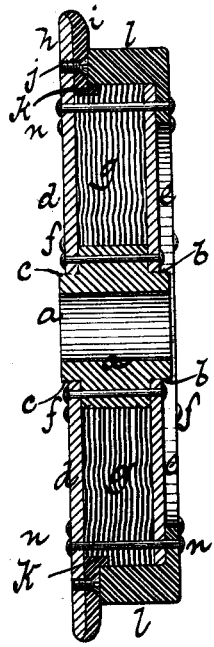
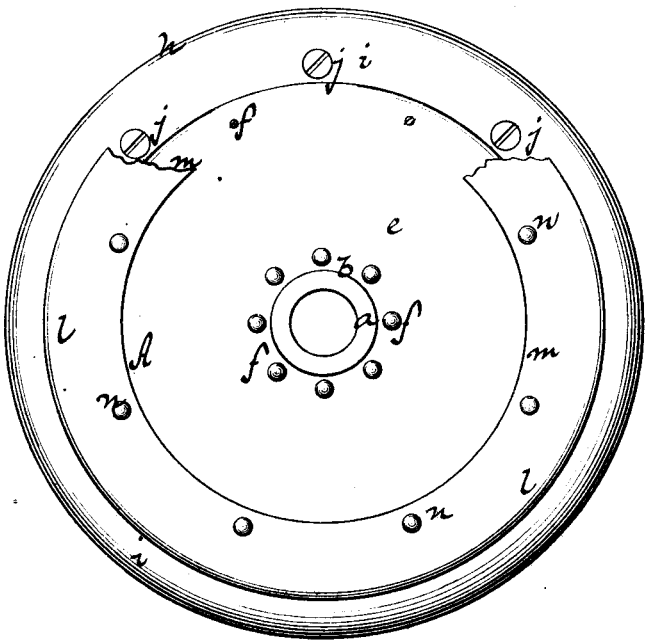
Fig. 3.
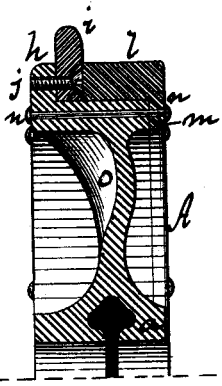
Witnesses:
Otto Hufeland
William Miller.
Inventor:
John Absterdam.
by
Van Santvoord & Hauff
his attorneys.
N. PETERS, PHOTO-LITHOGRAPHER, WASHINGTON, D. C.

UNITED STATES PATENT OFFICE.

JOHN ABSTERDAM, OF NEW YORK, N. Y.

CAR-WHEEL.

SPECIFICATION forming part of Letters Patent No. 236,525, dated January 11, 1881.

Application filed May 13, 1880. (No model.)

*To all whom it may concern:*

Be it known that I, JOHN ABSTERDAM, a citizen of the United States, residing at New York, in the county and State of New York, have invented a new and useful Improvement in Car-Wheels, of which the following is a specification.

My invention consists in constructing a steel-tired wheel with a detachable tire provided with an inner annular flange or web at the opposite end of the regular flange of the wheel, and an annular metallic flange secured between the steel tire and in the inner surface of a flange formed by one side of the wheel, so that when the annular flange wears off before the tire wears off the flange can be replaced by another without disturbing the remaining portion of the wheel, or without interfering with the life of the wheel proper, so that the same wheel may be continually used by simply replacing the worn-out part, either by a new flange or tire, or both, according to whichever may be worn out first.

It also consists in the particular mode of forming an annular wood filling for the central part of the wheel.

This invention is illustrated in the accompanying drawings, in which Figure 1 represents a central section. Fig. 2 is a face view, partly in section. Fig. 3 is a central section of a modification.

Similar letters indicate corresponding parts.

In the drawings, the letter A designates a car-wheel, which may be of any suitable form. The wheel shown in Figs. 1 and 2 is composed of a hub, *a*, which is, by preference, made of cast-iron, and provided with two shoulders, *b c*. On each end of this hub is slipped a ring-plate, *d e*, by preference made of wrought-iron, and these plates are firmly fastened to the hub by rivets or bolts *f*. The annular space between the plates *d e* is filled up with a solid body of wood, *g*, and the plate *d* extends up beyond the circumference of the plate *e* and of the wood filling *g*, so as to form the flange *h*. The inner surface of this flange is protected from wearing against the rails by an annular flange, *i*, of steel or other equivalent material, which is made of the proper thickness and length, the inner circumference resting on the periphery of the wood filling *g*, and is fastened into the inner surface of the flange *h* by rivets or screws *j*. On the inner edge of this flange is formed a small flange, *k*, projecting at right angles from the flange *i*, which is let in flush with the circumference of the wood filling *g*. The tire *l* is made of steel or other equivalent material, and it is provided with an inner annular flange or web, *m*, which bears against the outer surface of the ring-plate *e*, while the opposite side of this tire *l* bears firmly against the annular flange *i* and the heads of the screws *j*, while the inner circumference of this tire bears firmly upon the periphery of the wood filling *g*, and on the small flange *k* of the annular flange *i*. The tire *l*, the ring-plates *d e*, and the wood filling are fastened together by rivets or bolts *n*.

It will be seen from this description that in my wheel, as illustrated in the drawings, the flange *i* is not only held in position by the screws *n*, screwed or riveted into the flange *h*, but is firmly held in its place, clasped between the inner side of the tire *l* and flange *h*, by tightening the bolts or rivets *n*, and those parts of this wheel which are chiefly liable to wear—viz., the tire and the annular flange *i*—are made of steel, while the remaining parts of the wheel are made of a cheaper material, and when either the annular flange or the tire wears off first these parts can be readily replaced without disturbing the remaining parts.

As the tire can be made of any desired thickness, while the flange is generally limited to about one and one-fourth inch in order to pass through the frogs, it is evident that the flange is liable to wear off in curving before the tire is worn out.

The ring-plate *d* may be made to project out about even with the periphery of the tire *l*, and said tire may be made all of one piece with the flange *i*, when desired to do so.

In order that my invention may be practically carried out by those skilled in the art to make and use the same, I will here describe the mode of forming the wooden filling *g*.

I take wood, saw it into veneers, cut these veneers into segments of the length required, and boil them in water to extract the resinous gum contained in the wood. A suitable quantity of borax or some alkali may be added to the water to aid in dissolving such sap or gums. Then the segments are washed and dried. I then form a circular pile of these veneers around the hub *a* by laying one layer of these veneers upon the other, with the small end of the segments against said hub, a heavy coat of marine glue or other suitable water-proof cement being applied to both sides of each layer of veneers, care being taken to cross the joints of each layer of these segments and cut their inner ends of the required curve to fit the periphery of the hub; and when the pile is sufficiently thick I submit it to a powerful pressure by a hydraulic or other suitable press, thereby pressing the pile of veneers into one solid annular body as the glue or cement is forced through the wood, and the fibers of the same are pressed and cemented into one solid mass. I then turn the periphery and side of this wood to its required dimensions by inserting a mandrel in the said hub and revolving the same in a suitable frame or lathe by some suitable mechanical means. I also turn the peripheries of the plates *d* and *e* and the annular flange *i* to their proper dimensions, as the case may require, and having also turned the steel tire to its required diameter, I press or force the same over the peripheries of the plate *e* and wood filling *g* and the small flange *k*, and against the annular flange *i*, when such flange is used, and the whole being riveted together, as before stated, thereby forming the above-described wheel. The veneers, if cut into segments of the required length and their ends of the proper curve, may be formed into a circular pile around the said hub and within the inner circumference of the tire, and then pressed together into one solid body by the means before described. In this case care must be taken to lay the tire on some suitable bed, with the flange *m* resting on said bed. This pressing the wood pile within the tire will save the turning of the periphery of the wood and forcing the tire on the same. When bolts are used instead of rivets, it is intended that such bolts should be provided with secure lock-nuts, or to be secured from loosening by the motion of the wheels by some suitable means.

My invention is also applicable to cast-iron wheels, as shown in Fig. 3. When the flange *h* is cast solid with the felly of the web *o* and hub *a*, and projects only flush or nearly even with the periphery of the steel tire, the annular flange *i* in this case is sufficiently thick to answer as a suitable substitute for the flange *h* in performing the functions of a regular flange, and is fastened in position by means of rivets or screws, either riveted or screwed into the inner side of the flange *h* of the felly of the web *o* by the screws *j*. The tire *l*, which is also made of steel, is provided with an inner flange or web, *m*, situated under the side of the tire opposite to the side of its regular flange. The periphery and sides of the fellies of the web *o* are turned to their proper dimensions, and after the annular flange, the inner circumference of the tire, and the inner side of the flange of the web *m* have been turned to their proper dimensions, I force the tire on the periphery of the felly of the web *o*, and against the annular flange *i*, the flange or web *m* of the tire being also firmly fastened against said felly by the bolts or rivets *n*. This substituted flange *i* may be made with a shoulder resting on the periphery of the short flange *h*.

What I claim as new, and desire to secure by Letters Patent, is—

1. The combination, in a car-wheel, of an outer flange, *h*, a detachable metallic annular flange, *i*, fastened to the flange *h*, a metallic tire, *l*, provided with an inner flange, *m*, opposite to the outer flange, *h*, the tire *l*, and annular flange *i*, encircling the periphery of the main body of the wheel, all secured to the said wheel by rivets or bolts *n*, extending through the inner flange, *m*, of the tire and body of the wheel, without passing through the detachable flange *i*, substantially as and for the purpose set forth.

2. The combination, in a car-wheel having a wood filling, *g*, of the outer metallic flange, *h*, the annular metallic flange *i*, encircling the wood filling *g* and fastened to the outer flange, *h*, a rim or flange, *k*, formed on the annular flange *i*, at right angles thereto, the metallic tire *l*, having an inner flange, *m*, opposite to the flange *h*, the hub *a*, and rivets or bolts *n*, extending through the flange *m* of the tire, the side plates, and body of the wheel, substantially in the manner and for the purpose set forth.

In testimony whereof I have hereunto set my hand and seal in the presence of two subscribing witnesses.

JOHN ABSTERDAM. [L. S.]

Witnesses:
E. F. KASTENHUBER,
CHAS. WAHLERS.